June 12, 1928.  1,673,744

G. W. GAGE

DRILLING MACHINE WITH SPLIT BOX

Filed June 7, 1926

George W. Gage,
INVENTOR

BY Victor J. Evans
ATTORNEY

P. S. Hickey.
WITNESS:

Patented June 12, 1928.

1,673,744

UNITED STATES PATENT OFFICE.

GEORGE WELLINGTON GAGE, OF PARNASSUS, PENNSYLVANIA.

DRILLING MACHINE WITH SPLIT BOX.

Application filed June 7, 1926. Serial No. 114,371.

This invention relates to improvements in drilling machines, the general object of the invention being to provide a double crank for operating the machine which is formed solid and to provide a split boxing for rotatably supporting the crank.

Another object of the invention is to provide improved means for transmitting the movement of the driven gear to the chuck member.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
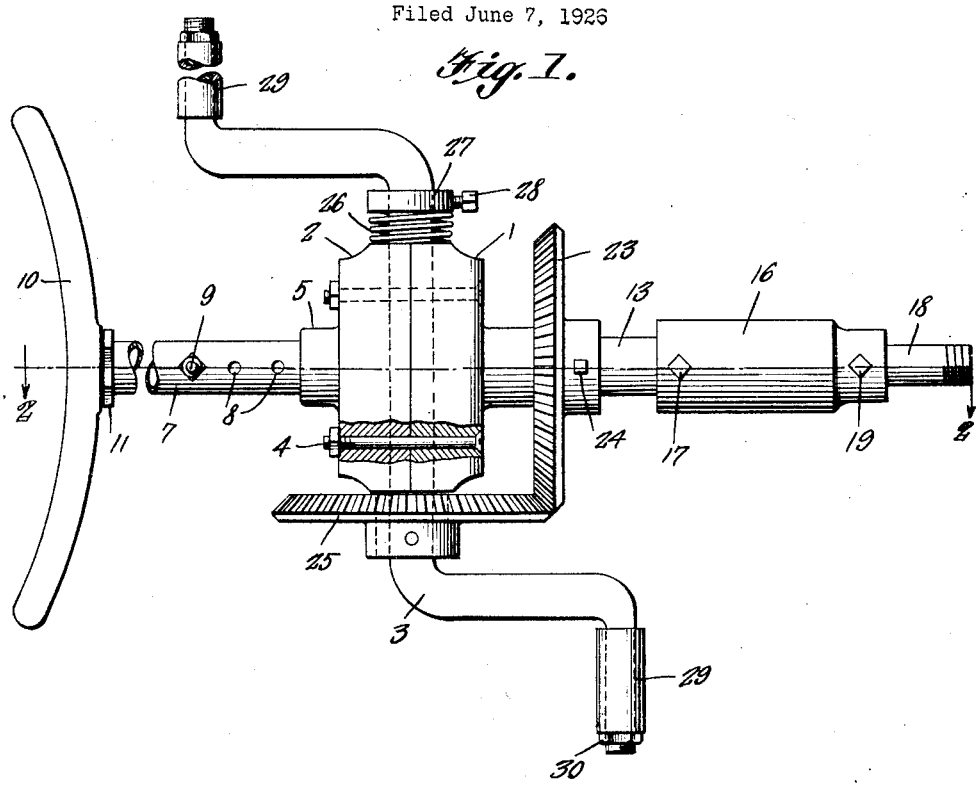
Figure 1 is an elevation of the device.
Figure 2:
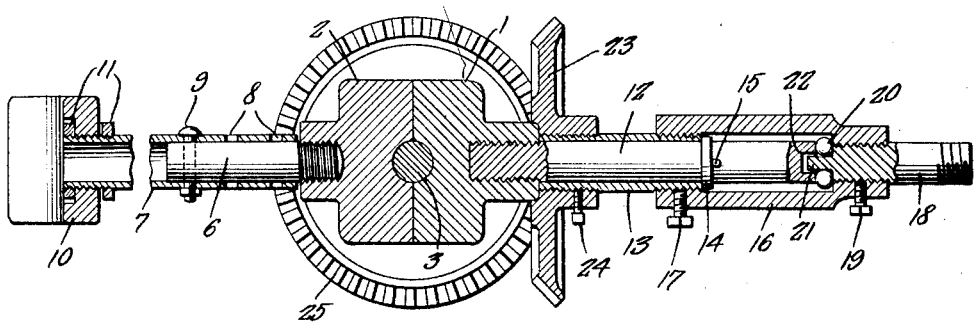
Figure 2 is a section on line 2—2 of Figure 1.

In these views, 1 and 2 indicate two halves of a split boxing which forms a journal for a double crank 3 formed of one piece of material bent to form a crank handle at each end thereof. After the central portion of the crank is placed between the two halves, the two halves are bolted together by the bolts 4. Each half is provided with a boss 5 on its outer face, the boss of the section 2 receiving the threaded end of a stud 6 over which fits a tube 7 which is provided with several pairs of holes 8, any pair of which is adapted to receive a bolt 9 which also passes through a hole in the stud. Thus the tube 7 is adjustably connected with the stud. A breast plate 10 is fastened to the outer end of the tube by the nuts 11. A stationary shaft 12 has its threaded end engaging the boss of section 1 and a tube 13 is held on the inner part of this shaft by a washer 14 which is held in place by a pin 15 passing through the shaft. A sleeve 16 is threaded to the outer end of the tube 13 and a set screw 17 locks the parts together. A chuck or tool carrying member 18 is threaded in the outer end of the sleeve 16 and a set screw 19 locks these parts together. Ball bearings 20 are arranged between the outer end of the shaft 12 and the inner end of the chuck 18, said chuck having a projection 21 on its inner end which engages a recess 22 formed in the outer end of the shaft. A beveled gear 23 is threaded to the inner end of the tube 13 and is locked thereto by the set screw 24 and this gear meshes with a similar gear 25 which is carried by the crank shaft 3. A spring 26 encircles the shaft 3 and is held under tension by a collar 27 held to the shaft by a set screw 28, this spring acting to hold the gears in mesh. A handle 29 is rotatably mounted on each end of the crank shaft by the nut 30.

From the foregoing, it will be seen that by rotating the crank shaft, the gear 25 will rotate the gear 23 and the movement of this gear 23 will be communicated to the chuck or bit carrying member 18 through the tube 13 and the sleeve 16.

The shaft, as before stated, is made in one piece and is placed in the boxing by separating the two sections of the boxing and then bolting them together after the shaft has been put in place. The breast plate is adjustably connected with the boxing, as before stated. The shaft may be formed in sections, if desired.

Thus I have produced a simple and effective drill, mainly designed for coal mines, the parts of which can be easily assembled and adjusted to suit working conditions.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A drilling device of the class described comprising a sectional boxing, a crank shaft held between the sections of the same, a stem adjustably connected with the boxing, a breast plate carried thereby, a stationary shaft carried by the boxing, a tubular member thereon, a gear on the tubular member, a gear on the crank shaft meshing therewith, a sleeve connected with the tubular member and surrounding portion of the stationary shaft, a drill carrying member carried by the sleeve and anti-friction means between the inner end of the drill carrying member and the outer end of the stationary shaft.

In testimony whereof I affix my signature.

GEORGE WELLINGTON GAGE.